(12) United States Patent
Loewenstein

(10) Patent No.: US 10,596,620 B2
(45) Date of Patent: Mar. 24, 2020

(54) MOLD FOR PRODUCING CAST PARTS

(71) Applicant: Joerg Loewenstein, Bremen (DE)

(72) Inventor: Joerg Loewenstein, Bremen (DE)

( * ) Notice: Subject to any disclaimer, the term of this patent is extended or adjusted under 35 U.S.C. 154(b) by 76 days.

(21) Appl. No.: 14/362,831

(22) PCT Filed: Dec. 5, 2012

(86) PCT No.: PCT/DE2012/001162
§ 371 (c)(1),
(2) Date: Jun. 4, 2014

(87) PCT Pub. No.: WO2013/083113
PCT Pub. Date: Jun. 13, 2013

(65) Prior Publication Data
US 2015/0047800 A1 Feb. 19, 2015

(30) Foreign Application Priority Data
Dec. 5, 2011 (DE) .................. 10 2011 120 220

(51) Int. Cl.
*B22C 9/06* (2006.01)
*B22D 23/00* (2006.01)
*B22D 23/02* (2006.01)
(Continued)

(52) U.S. Cl.
CPC ............ *B22C 9/062* (2013.01); *B22D 23/006* (2013.01); *B22D 23/02* (2013.01); *B22D 29/00* (2013.01); *B22D 45/00* (2013.01); *B29C 33/24* (2013.01)

(58) Field of Classification Search
CPC ...... B22D 23/006; B22D 27/08; B22D 41/06; B22D 17/26–266; B22D 21/08;
(Continued)

(56) References Cited

U.S. PATENT DOCUMENTS 2,304,899 A  12/1942  Dupre
2,367,727 A   1/1945  McWane
(Continued)

FOREIGN PATENT DOCUMENTS

CN  101733912 A   6/2010
DE     2545178 A1  5/1976
(Continued)

OTHER PUBLICATIONS

Machine translation of Hagel (DE 102004014100 B3, cited in IDS filed Jun. 4, 2014) (Year: 2005).*
(Continued)

*Primary Examiner* — Kevin E Yoon
*Assistant Examiner* — Jacky Yuen
(74) *Attorney, Agent, or Firm* — Hauptman Ham, LLP

(57) ABSTRACT

A mold for production of cast parts, having two mold parts in the form of mold plates, which mold parts are movable with respect to each other from an open position into a closed position, wherein the mold parts in their closed position define a mold cavity which may be filled with liquid casting compound and in their open position enable removal of a cast part which has solidified by at least partial cooling, and are lockable in their closed position by a locking device which joining the two mold parts so as to be releasable, and which mold parts may also be swung, wherewith in the closed position the locking device produces the locking of the mold plates with the stipulation that the locking pressure is maintained. The locking device has an energy storage means with a gas pressure spring for maintaining the closing pressure which presses the mold plates together after they have initially been pressed together.

8 Claims, 2 Drawing Sheets

(51) Int. Cl.
  *B22D 29/00* (2006.01)
  *B22D 45/00* (2006.01)
  *B29C 33/24* (2006.01)

(58) Field of Classification Search
  CPC ......... B22D 21/10; B22C 9/062; B22C 21/08; B22C 21/10
  See application file for complete search history.

(56) References Cited

U.S. PATENT DOCUMENTS

| | | | |
|---|---|---|---|
| 3,426,399 A * | 2/1969 | Jones | B25B 31/005 24/453 |
| 4,076,070 A | 2/1978 | Lefebvre et al. | |
| 4,509,878 A | 4/1985 | Bryson et al. | |
| 4,702,688 A * | 10/1987 | Schenk | 425/450.1 |
| 5,044,921 A * | 9/1991 | Micelli | A23G 1/21 24/453 |
| 5,240,361 A * | 8/1993 | Armstrong | F16B 19/109 269/48.2 |
| 6,984,120 B2 * | 1/2006 | Yoshinaga et al. | 425/589 |
| 7,611,346 B2 * | 11/2009 | Schad | B29C 45/6728 425/190 |
| 2008/0145471 A1 | 6/2008 | Richter | |
| 2010/0166909 A1 * | 7/2010 | Mizutani | B29C 45/6728 425/595 |
| 2010/0330227 A1 | 12/2010 | Godde | |

FOREIGN PATENT DOCUMENTS

| | | |
|---|---|---|
| DE | 3422171 A1 | 12/1984 |
| DE | 10048894 A1 | 5/2001 |
| DE | 102004014100 B3 | 9/2005 |
| EP | 2508322 A1 | 10/2012 |
| JP | 2001088132 A * | 4/2001 |

OTHER PUBLICATIONS

International Search Report dated Oct. 29, 2013 in PCT Application PCT/DE2012/001162, 8 pages.

* cited by examiner

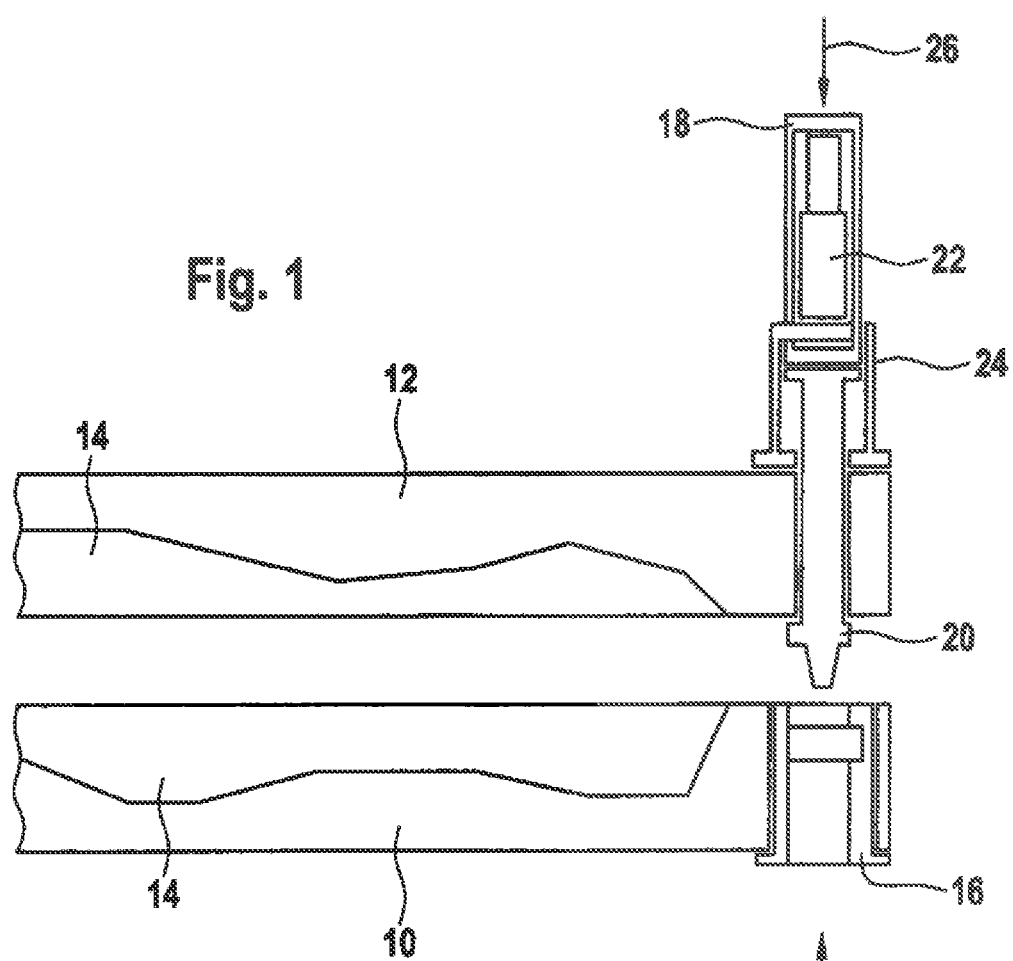
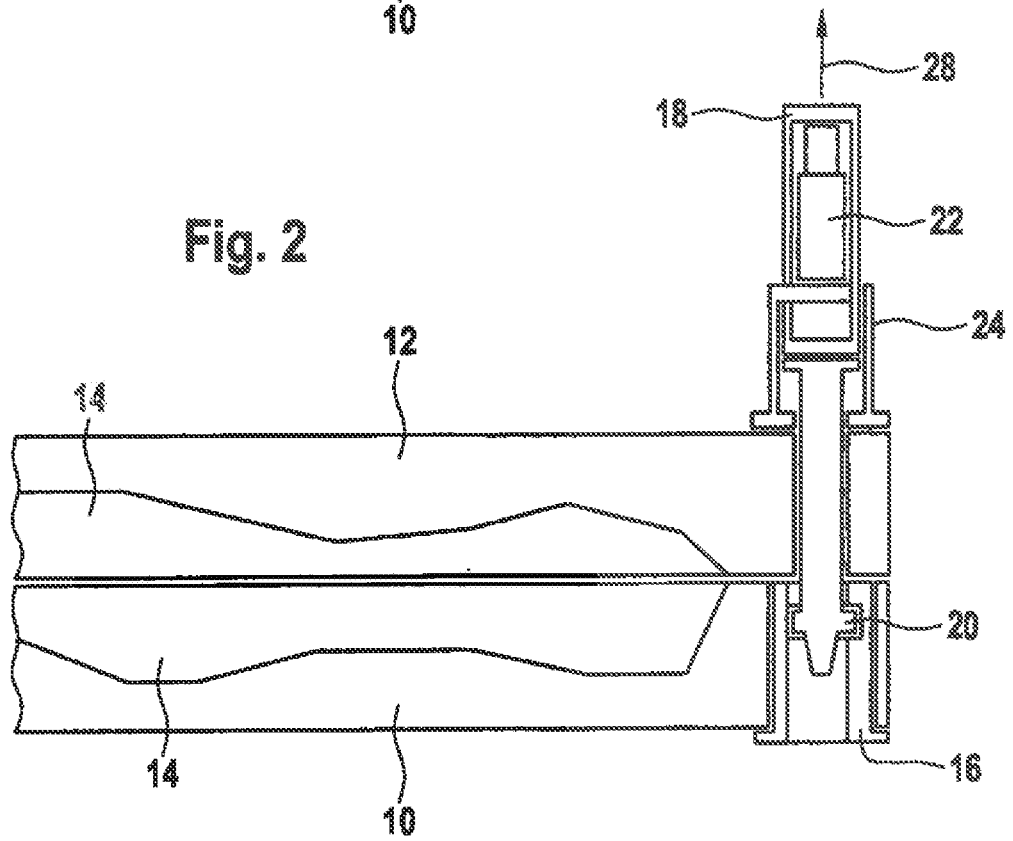

MOLD FOR PRODUCING CAST PARTS

RELATED APPLICATIONS

The present application is National Phase of International Application Number PCT/DE2012/001162 filed Dec. 5, 2012 and claims priority to German Application Number 10 2011 120 220.3 filed Dec. 5, 2011.

The invention relates to a mold for production of cast parts, having two mold parts movable with respect to each other from an open position into a closed position, wherein the mold parts in their closed position define a mold cavity fillable with liquid casting compound and in their open position enable the removal of a cast part (which has in particular solidified by at least partial cooling), and are lockable in their closed position by means of a locking device which joins the two mold parts so as to be releasable, and which mold parts may be pivoted around predeterminable axes by means of a gripping device (in particular a robot arm) in accordance with a casting program which is adjustable as to shape, time sequence and regions of the mold cavity which arc to be wetted.

A mold of this type is known from DE 10 2004 014 100 B3. In the device arrangement described there for 5-axis tilt casting of molds, a tilt casting mold is used which has undefined dimensions with regard to the locking device for locking the mold parts with one another in the closed position, in which arrangement the mold may be tilted by means of a robot arm into the positions desired according to a given casting program. This device has a problem in maintaining the mutual contact pressure of the mold parts if—in a reasonable modification of the known device—the mold is freely swung independently by a heavy casting apparatus or the like.

The underlying problem of the invention was to refine the known mold to the effect that, during the swinging movements of the mold according to the casting program, the mold is secured via a locking mechanism belonging to the mold, and after the mold parts are pressed together and charged with the desired mold pressure, a locking may be produced by means of a locking mechanism integrated into the mold.

According to the invention, this object is achieved in a refinement of the mold according to the species in that the mold parts which are movable with respect to each other are two mold plates which are movable with respect to each other from an open position into a closed position, along an essentially straight line along an axis of movement which is essentially perpendicular to the planes of said plates, wherewith in the closed position the locking device (which joins the two mold plates so as to be releasable) accomplishes: the locking of the mold plates in a pressed-together state, with the stipulation that the locking pressure is maintained while the mold plates are in their closed position; that the locking device has an energy storage means with a gas pressure spring to maintain the closing pressure which presses the mold plates together after the pressing together of the mold plates by a closing device which is extrinsic to the mold, Which closing device acts essentially perpendicular to the midplane of the mold plates; and that the locking device has a locking sleeve on one of the mold plates, on the other mold plate a tension sleeve which is essentially aligned with the locking sleeve, and a movable tension bolt interacting with the locking sleeve and the tension sleeve, which bolt is movable essentially in the direction perpendicular to the plane of the mold plates and is axially mounted in a locking receptacle provided at one of the mold plates so as to be longitudinally displaceable if charged by the energy storage means.

The two mold plates thereby advantageously have a rectangular shape.

Another embodiment of the invention is characterized by an emergency release mechanism for the mold plates and ejection of the at least: substantially solidified cast piece after conclusion of the casting program.

It may be provided that the emergency release mechanism has a gas pressure actuator and has push rods and ejector rods charged by the gas pressure actuator for demolding of an at least partially solidified cast piece.

Given those embodiments of the invention in which an emergency release device of the claimed type is provided, this ensures that the solidifying or solidified cast may be reliably demolded independently of the given position and process phase in which the mold is currently located.

Overall, the underlying concept of the invention is the surprising realization that the problem that has been posed may be solved in an elegant fashion in that the mold itself is "autarchically" provided with the locking mechanism according to the invention, which enables it to reliably keep the mold cavity formed by the form plates tightly sealed after the mold plates or, respectively, the mold parts (or, respectively, mold halves) formed by these mold plates have been pressed together, and after the charging of the mold plates with the desired closing pressure, wherewith at the same time—via the nearly unlimited movement capability by means of a robotic arm or the like—it is readily possible to wet all of the regions of the mold cavity that are defined in this regard.

Locking devices of the type provided according to the invention are disclosed neither in connection with the device according to the species nor given molds according to DE-PS 1 243 331, DE-OS 25 45 178 and/or DE 34 22 171. None of these publications discloses the swinging of a mold and/or of casting mold that may be freely handled (for example by a robotic arm) which would automatically lockable by maintaining the closing force. Rather, these always deal with casting apparatuses in which the associated handling means for the casting mold are integrated into a heavy overall device which is substantially more complicated in terms of design and operation than the mold according to the invention.

In particular, the prior art also shows no indication whatsoever of an emergency release mechanism of the preferred embodiment of the type provided according to the invention.

Additional features and advantages of the invention arise from the claims and from the following description, in which exemplary embodiments are explained in detail with reference to the schematic drawings, as follows:

FIG. 1 illustrates an exemplary embodiment of a mold according to the invention in a schematic lateral view, partially cut away, with the locking mechanism in the open position; and FIG. 2 illustrates the exemplary embodiment of FIG. 1 in a view corresponding to that of FIG. 1 but with the locking mechanism closed;

Figure 3:
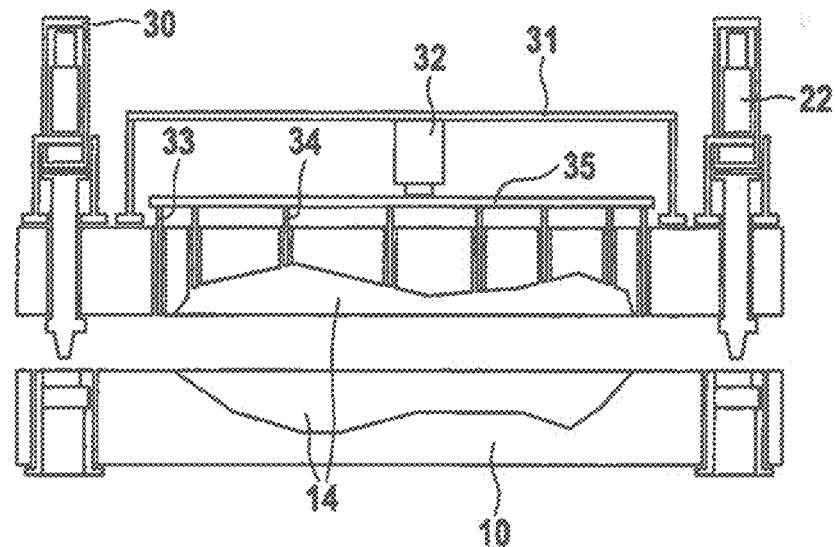
FIG. 3 is a schematic lateral view, partially cut away, of an exemplary embodiment of a mold with an emergency release mechanism, in the unlocked state.

As shown in FIG. 1, the exemplary embodiment of a mold according to the invention that is illustrated there for the production of cast metal parts has, vertically superposed, a first mold plate 10 (shown below in the drawing) and a second mold plate 12 (shown above in the drawing) which—as schematically represented in the drawing—define a mold cavity 14 when in the closed state (FIG. 2). In FIG. 1, the second mold plate 12—which is typically an essentially rectangular mold half of a lockable swinging mold, disposed horizontally in the position shown in FIGS. 1 and 2—is disposed at a distance above the first mold plate 10 so that the mold cavity 14 is accessible laterally, as is particularly necessary for removing a finished cast metal piece. Located on the right side of the mold shown in FIGS. 1 and 2 is a locking device which has a locking sleeve 16 disposed in the first mold plate 10, a tension sleeve 18 provided at the second mold plate 12, and a tension bolt 20 which may be charged by a gas pressure spring 22 Which serves as an energy storage means. The tension bolt 20 is displaceable in terms of its level in a locking receptacle 24 (vertical direction as seen in FIGS. 1 and 2).

In the exemplary embodiment according to FIGS. 1 and 2, the mold according to the invention is used as follows: first, a closing force is exerted on the second mold plate 12 in the direction of arrow 26 to press the mold plates 10, 12 together (meaning to press the second mold plate 12 downward from the upper position shown in FIG. 1 into a lower position near the first mold plate 10), for example via a corresponding pressing device of a casting apparatus as it is also used in conventional swinging molds. As soon as the closing force (acting in the direction of arrow 26 in FIG. 1) presses the second mold plate 12 against the first mold plate 10 and thereby closes the mold space as illustrated in FIG. 2 (and in fact counter to the force of the gas pressure spring 22 serving as an energy storage means), the force of the gas pressure spring 22 (acting in the direction of arrow 28 in FIG. 2) presses the tension sleeve 18 upward, wherewith the tension bolt 20 brings about a durable locking of the mold plates 10, 12 in the closed position.

In this locked state under the tension (or, respectively, closing force) of the gas pressure spring 22, the mold (comprised of the locked mold plates 10,12) is "autarchically" locked so that the mold may be freely swung by means of a handling device which does not need to contribute to the maintenance of the closing force which presses the mold plates 10, 12 together, as is needed for wetting or, respectively, reaching all of the necessary regions of the mold cavity 14 with the liquid metal that has been introduced in the interim. After conclusion of the casting process and corresponding cooling of the mold, the mold plates 10, 12 may be returned to the open position shown in FIG. 1 by raising the second mold plate 12 out of the locked position shown in FIG. 2, at which point the cast metal part may be removed from the mold cavity 14.

Figure 4:
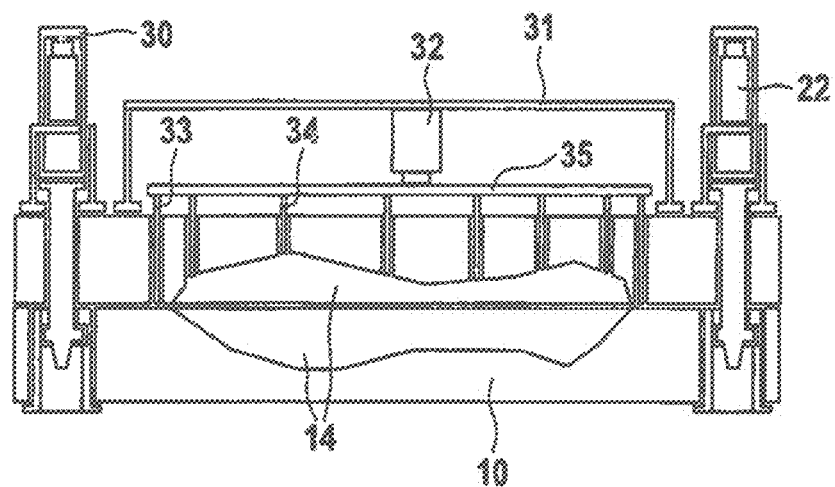
FIG. 4 illustrates the exemplary embodiment according to FIG. 3 in the locked state.
Figure 5:
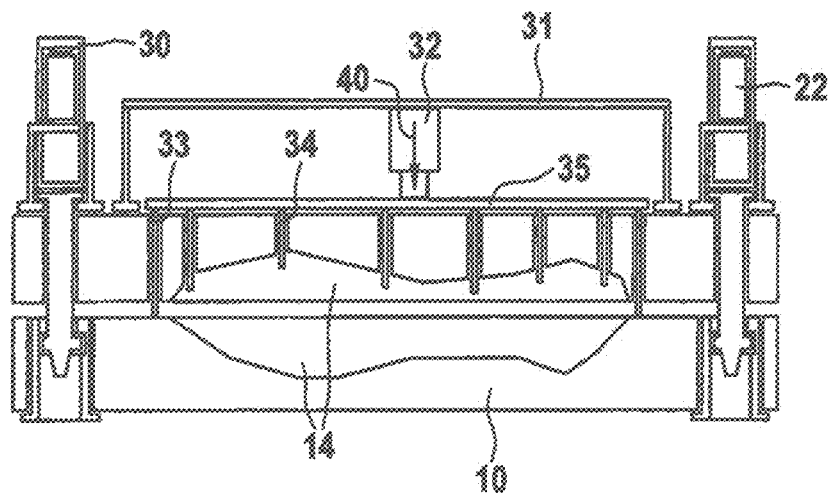
FIG. 5 illustrates the exemplary embodiment of to FIG. 3 and FIG. 4 following a successful emergency release.

In the exemplary embodiment according to FIGS. 3-5, emergency release mechanism is provided which allows a situation in which solidifying cast parts may "shrink away" from the molding surfaces of the mold pieces if strong cooling is experienced. The constringent casting compound (particularly a light metal alloy, for example) may come to be wedged into the mold cavity such that a significantly increased effort must be expended in removing the cast piece in order to release the cast piece from the mold; however, on the other hand damage to the cast piece or even to the mold is to be anticipated.

Conventional casting apparatuses, in which the mold halves are integrated into heavy, compact casting apparatuses, solve this problem by the use of ejection functions after expiration of a predefined time period. Such ejection functions correspond to the mechanisms that likewise remove cast parts from the molds in normal operation.

In contrast to this, a freely movable mold (as illustrated in the exemplary embodiment according to Figure and FIG. 2 and described with reference to said Figures) is not connected to the mechanisms of the casting apparatus for removing the cast parts during all phases of the process. Thus, process states may arise in which it is not possible to remove the cast parts, even though the point in time that is required for this has already arrived.

For this reason, an emergency release mechanism according to the exemplary embodiment of FIGS. 3-5 is designed such that the cast part may be demolded independently of the respective position and process phase in which the mold is located.

According to the exemplary embodiment of FIGS. 3-5, an emergency release mechanism 32 is provided that has a gas pressure spring which may be pressurized via corresponding valve switching. The force thereby acts against the locking means of the mold, wherein said force is less than the closing force produced by the gas pressure spring 22 of FIGS. 1 and 2. As a result of this, the casting mold shown in FIGS. 3-5 (the remaining structure of which, apart from the emergency release mechanism, corresponds to the exemplary embodiment according to FIG. 1 and FIG. 2) may be transferred by the gas pressure spring 22 from the unlocked position shown in FIG. 3 into the locked position according to FIG. 4, without the force produced in the emergency release mechanism 32 (which is realized by a gas pressure spring) being able to push the mold halves apart from each other.

However, if the pressure in the gas pressure spring 22 according to FIGS. 1-5 is released, the gas pressure spring 22 forces push rods 33 (which are disposed on an ejector plate 35 which is actuatable by means of the emergency release mechanism 3) and ejector rods 34 out of the position shown in FIG. 4 into the position shown in FIG. 5 ( in the embodiment depicted in the Figures downward, as represented by arrow 40), wherewith the mold halves are moved to a distance from one another (by means of the push rods 33) and the cast part is demolded (by the ejector rods 34).

In the event of the use of a locking system based on a gas pressure spring, the compressed gas actuator of the locking system may thus be combined with said gas pressure spring, wherewith the pressure stored in the locking system may be used for the emergency release device, This occurs in that pressure stored in the gas pressure spring 22 is passed to the gas pressure spring 32 by opening a valve, thereby serving to operate the emergency release mechanism.

In correspondence with the mechanisms of conventional casting apparatuses, the emergency release system according to FIGS. 3-5 may be employed as necessary at both mold halves, enabling demolding at both sides.

The features of the invention disclosed in the preceding description, in the drawings and in the claims may be essential, individually and in any combination, for realizing the invention in its various embodiments.

The invention claimed is:
1. A mold for production of cast parts, comprising:
two mold parts
  wherein at least one of the mold parts of the two mold parts is movable relative to the other to transform an open position into a closed position,
  wherein in the closed position the mold parts define a mold cavity fillable with liquid casting compound, and in their open position the mold parts enable removal of a cast part which has solidified by at least partial cooling, and a locking device, wherein the mold parts are lockable in the closed position by the locking device configured to join the two mold parts so as to be releasable, and wherein the mold parts are swingable around predeterminable axes in accordance with a casting program which is adjustable as to shape, time sequence and regions of the mold cavity which are to be wetted, wherein the two mold parts are respectively mold plates, wherein at least one of the two mold parts is movable with respect to the mold part from the open position into the closed position in an essentially straight line along a movement direction which is essentially perpendicular to planes of said mold plates, wherewith in the closed position the locking device which joins the two mold plates so as to be releasable brings about the locking of the mold plates in a pressed-together state such that a locking pressure is maintained while the mold plates are in their closed position, wherein the locking device includes a gas pressure spring configured to store energy to maintain a closing pressure which presses the mold plates together after the mold plates are closed and pressed together in a direction essentially perpendicular to the midplane of the mold plates, wherein the locking device further has
- a locking sleeve at one of the mold plates,
- a tension sleeve at the other mold plate, the tension sleeve is essentially aligned with the locking sleeve, and
- a movable tension bolt configured to interact with the locking sleeve and the tension sleeve, wherein the tension bolt is movable essentially in the movement direction perpendicular to the planes of the mold plates, and is axially mounted in a locking receptacle provided at one of the mold plates, with the movement of the tension bolt being subject to the action of closing pressure from the gas pressure spring, wherein the mold is part of a mold apparatus, wherein the mold apparatus is configured to automatically swing the two mold parts around the predeterminable axes, and wherein the tension sleeve houses the gas pressure spring and an entirety of the tension sleeve is provided outside of said other mold plate when the mold plates are in the open and closed positions.

2. The mold according to claim 1, wherein the mold plates have a rectangular shape.

3. The mold according to claim 1, wherein the mold is configured to eject the at least substantially solidified cast piece after conclusion of the casting program in the event of an emergency.

4. The mold according to claim 3, wherein the mold includes a gas pressure actuator, and the mold includes push rods and ejector rods which are charged by the gas pressure actuator for demolding of an at least partially solidified cast part.

5. An assembly, comprising:
a mold for production of cast parts, having two mold parts movable with respect to each other from an open position into a closed position, wherein
the mold parts in the closed position define a mold cavity fillable with liquid casting compound and in the open position enable removal of a cast part which has solidified by at least partial cooling, and are lockable in their closed position by means of a locking device which joins the two mold parts so as to be releasable, the mold parts are configured to be swung around predeterminable axes in accordance with a casting program which is adjustable as to shape, time sequence and regions of the mold cavity which are to be wetted, the movable mold parts are two mold plates which are movable with respect to each other from the open position into the closed position in an essentially straight line along a movement direction which is essentially perpendicular to planes of said mold plates, wherewith in the closed position the locking device which joins the two mold plates so as to be releasable brings about the locking of the mold plates in a pressed-together state, with the stipulation that a locking pressure is maintained while the mold plates are in the closed position, the locking device includes a gas pressure spring to maintain a closing pressure which presses the mold plates together after the mold plates are closed and pressed in a direction essentially perpendicular to the midplane of the mold plates, the locking device further has
- a locking sleeve at one of the mold plates,
- a tension sleeve at the other mold plate, the tension sleeve is essentially aligned with the locking sleeve, and
- a movable tension bolt configured to interact with the locking sleeve and the tension sleeve, wherein the tension bolt is movable essentially in the movement direction perpendicular to the planes of the mold plates, and is axially mounted in a locking receptacle provided at one of the mold plates, a movement of the tension bolt being subject to the action of closing pressure from the gas pressure spring, wherein the assembly is configured to automatically swing the two mold parts around the predeterminable axes, and wherein the tension sleeve houses the gas pressure spring and an entirety of the tension sleeve is provided outside of said other mold plate when the mold plates are in the open and closed positions.

6. The assembly according to claim 5, wherein the locking sleeve is adjacent a first cavity in one of the mold plates, and the tension bolt is adjacent a second cavity in the other of the mold plates, wherein the first cavity and the second cavity collectively establish the mold cavity in the closed position of the mold plates.

7. The assembly according to claim 5, wherein
the locking receptacle is provided outside of the other mold plate and on a same side as the tension sleeve, and
the tension sleeve and the tension bolt are configured to move inside the locking receptacle in response to an action of the gas pressure spring.

8. The mold according to claim 1, wherein
the locking receptacle is provided outside of the other mold plate and on a same side as the tension sleeve, and
the tension sleeve and the tension bolt are configured to move inside the locking receptacle in response to an action of the gas pressure spring.

* * * * *